J. W. FAWKES.
Wheel-Cultivator.

No. 45,987.

Patented Jan. 24, 1865.

Witnesses:
Thos. Lusch
C. L. Topliff

Inventor:
J. W. Fawkes
per Munn & Co.
atty.

UNITED STATES PATENT OFFICE.

J. W. FAWKES, OF DECATUR, ILLINOIS.

IMPROVED CULTIVATOR.

Specification forming part of Letters Patent No. 45,987, dated January 24, 1865.

*To all whom it may concern:*

Be it known that I, J. W. FAWKES, of Decatur, in the county of Macon and State of Illinois, have invented a new and Improved Cultivator; and I do hereby declare that the following is a full, clear, and exact description thereof, which will enable others skilled in the art to make and use the same, reference being had to the accompanying drawings, forming part of this specification, in which—

Figure 1:
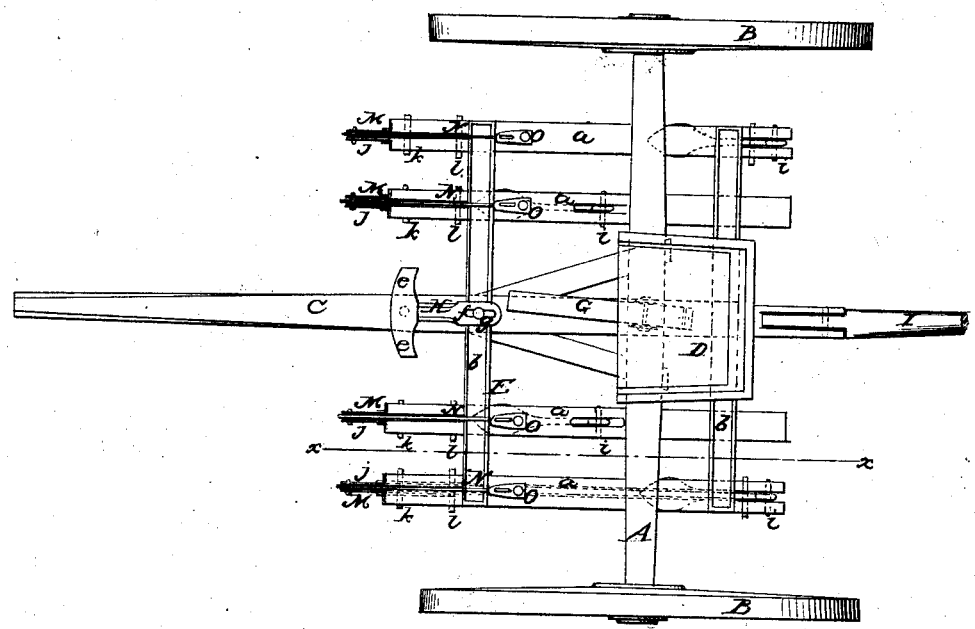
Figure 2:
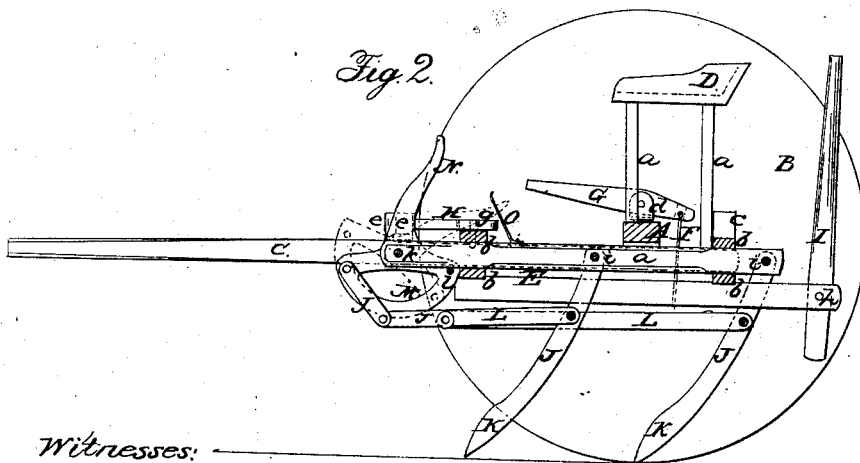

Figure 1 is a plan or top view of this invention; Fig. 2, a side sectional view of the same, taken in the line $x$ $x$, Fig. 1.

Similar letters of reference indicate like parts.

This invention relates to a new and improved cultivator for plowing those crops which are grown in hills or drills, such as corn, potatoes, &c.

The invention consists in a novel arrangement and application of the plows to the machine, whereby the former may be operated with the greatest facility, moved laterally in either direction to conform to the sinuosities of the rows of plants, or raised or lowered simultaneously, as may be required, and also adjusted so as to be entirely free from the ground as the implement is being drawn from place to place, due provision being also made to prevent the plows and their standards being strained or injured in case of coming in contact with obstructions.

A represents an axle having a wheel, B, at each end of it, and a draft-pole, C, secured to its center.

D is the driver's seat, placed on supports $a$, attached to the axle and the rear part of the draft-pole.

E represents a rectangular frame, composed of a series of longitudinal parallel bars, $a$, connected at a suitable distance apart by cross-bars $b$ at their front and rear ends and above and below them. The front bars $b$, both at the front and rear ends of the frame E, are placed one above the draft-pole and the other underneath it, the draft-pole serving as a support for the frame. The upper rear bar $b$ of the frame E is formed with a bow-shaped or curved central part, $c$, to admit of a certain degree of vertical play or adjustment of the rear part of said frame, and the latter, at its rear part, is connected by a rod, F, which passes up through the rear part of the draft-pole and is attached to a foot-lever, G, below the seat D, the fulcrum $d$ of said lever being on the axle A.

To the draft-pole C, at its upper side and just in front of the frame E, there is attached a T-shaped lever, H, the parts $e$ $e$ of said lever serving as foot-pieces, and one end being provided with an oblong slot, $f$, through which a screw, $g$, passes into the upper cross-bar $b$ of the frame E.

To the rear end of the central longitudinal bar $a$ of the frame E there is attached by a joint, $h$, a lever I, which may be turned upward in a vertical position when not required for use. (See Fig. 2.)

To all of the bars $a$ of the frame E, with the exception of the central one, there are attached by pivots $i$ plow-standards J, having ordinary cultivator-plows, K, at their lower ends. These standards J are connected by rods or bars L and a series of links, $j$, to the front ends of segments M, which are fitted on pivots $k$ in the front ends of the bars $a$, each segment M being provided with a handle, N. These segments M have each a wooden pin, $l$, passing through them, and these pins, as the machine is drawn along, bear against the under sides of the bars $a$, and in case of either plow meeting with an obstruction the pin $l$ of its segment M will break and allow the standard J to be forced back, thereby preventing breakage.

In order to move the plows laterally, so that they may conform to the sinuosities of the rows of plants, the driver simply actuates the lever H with his feet, and in order to raise and lower the plows he actuates the lever G, below the seat D, and in case the driver becomes tired of riding at any time he may walk behind the machine and operate the plows through the medium of the lever I.

In drawing the machine from place to place the plows K are elevated free from the surface of the ground by drawing back the handles N of the segments M and securing the former down by straps O.

I claim as new and desire to secure by Letters Patent—

1. The frame E, applied to the draft-pole C, as shown, in connection with the foot-levers H G, arranged with the frame to admit of the latter being operated as and for the purpose specified.

2. The pivoted plow-standards J, connected to segments M by bars L and links j, in connection with the wooden pins l in the segments, all arranged substantially as and for the purpose set forth.

3. Providing the segments M with handles N, in connection with straps O on the frame E, as and for the purpose set forth.

J. W. FAWKES.

Witnesses:
S. S. TROWBRIDGE,
GEORGE NIBINGER.